US010058893B2

(12) United States Patent
Dougherty

(10) Patent No.: US 10,058,893 B2
(45) Date of Patent: Aug. 28, 2018

(54) TOY PIECE COLLECTION SYSTEM

(71) Applicant: Gabe Dougherty, Tulsa, OK (US)

(72) Inventor: Gabe Dougherty, Tulsa, OK (US)

( * ) Notice: Subject to any disclaimer, the term of this patent is extended or adjusted under 35 U.S.C. 154(b) by 0 days.

(21) Appl. No.: 15/498,530

(22) Filed: Apr. 27, 2017

(65) Prior Publication Data

US 2017/0312787 A1 Nov. 2, 2017

Related U.S. Application Data

(60) Provisional application No. 62/328,113, filed on Apr. 27, 2016.

(51) Int. Cl.
*B07C 5/00* (2006.01)
*B07B 7/01* (2006.01)
*A47L 9/28* (2006.01)

(52) U.S. Cl.
CPC . *B07B 7/01* (2013.01); *A47L 9/28* (2013.01)

(58) Field of Classification Search
USPC ............................ 209/311, 19, 21, 643, 659
See application file for complete search history.

(56) References Cited

U.S. PATENT DOCUMENTS 2,462,878 A * 3/1949 Logue .................... B01D 35/20 209/269
3,662,886 A * 5/1972 Kennedy, Jr. ............. B07B 1/30 209/250
4,833,753 A 5/1989 Muller
4,898,564 A 2/1990 Gunn et al.
5,375,293 A 12/1994 Gilbertson
5,558,832 A * 9/1996 Noel ................. A61F 13/15658 264/113
5,768,748 A 6/1998 Silvera et al.
6,015,049 A * 1/2000 Heikes ................... A22C 25/00 209/311
6,216,876 B1 4/2001 Quillian, III
7,243,801 B2 * 7/2007 Posner ...................... B07B 4/08 198/818
7,979,957 B2 7/2011 Meyer
9,498,089 B2 11/2016 Noh
9,833,790 B2 * 12/2017 Rhodes, Jr. ............... B03B 5/00
2007/0023327 A1 * 2/2007 Li ............................ B03B 4/02 209/44
2008/0308472 A1 * 12/2008 Osiensky ................ D06F 93/00 209/643
2009/0078619 A1 * 3/2009 Hidaka ............... B01F 13/0255 209/659
2009/0261022 A1 * 10/2009 Srivatsan ............... A47B 67/04 209/2
2010/0243538 A1 * 9/2010 Uebayashi ................ B07B 1/34 209/26
2010/0270216 A1 * 10/2010 Burnett .............. B01D 33/0376 209/606
2012/0090639 A1 4/2012 Heldman et al.
2014/0047660 A1 2/2014 Factora et al.

* cited by examiner

*Primary Examiner* — Terrell H Matthews
(74) *Attorney, Agent, or Firm* — Hall Estill Attorneys at Law; Tyler J. Mantooth

(57) ABSTRACT

One or more toy pieces can be picked up and collected by various embodiments of a toy piece collection system. The system can consist of a bin operatively connected to a pressure source and an inlet. The bin may house a sorting structure that consists of a plurality of separated members each having at least one sorting aperture arranged to separate and sort materials by size.

15 Claims, 3 Drawing Sheets

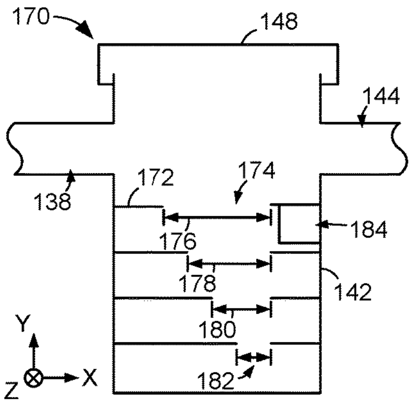
FIG. 3
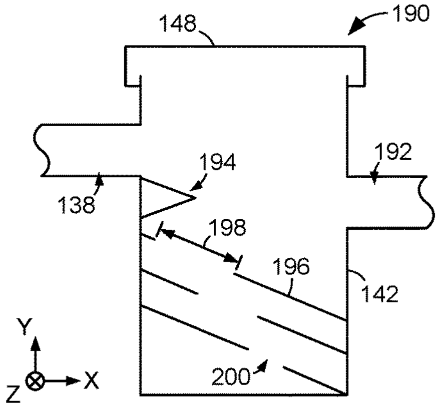
FIG. 4
FIG. 5
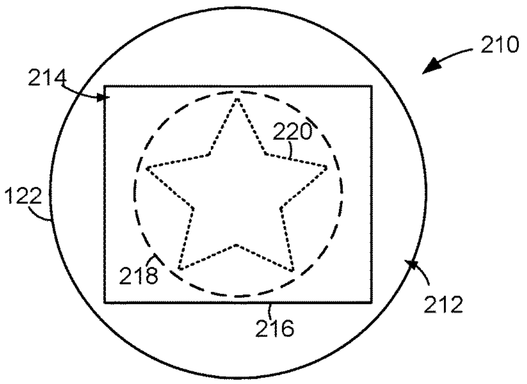
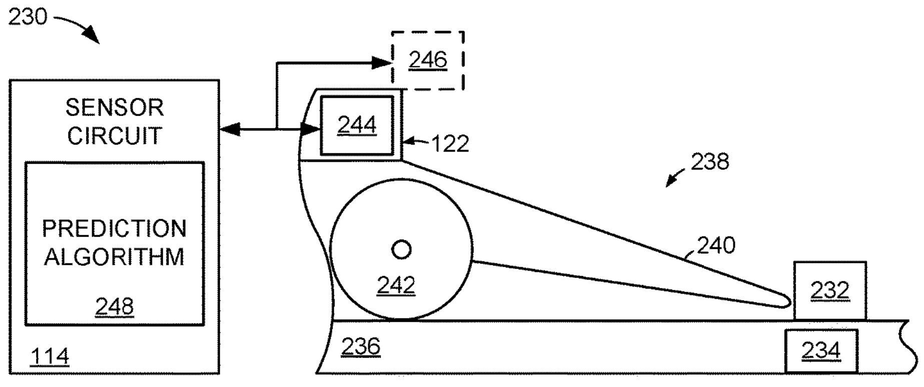
FIG. 6

TOY PIECE COLLECTION SYSTEM

RELATED APPLICATION

The present application makes a claim of domestic priority to U.S. Provisional Patent Application No. 62/328,113 filed Apr. 27, 2016, the contents of which are hereby incorporated by reference.

SUMMARY

A toy piece collection system, in accordance with various embodiments, has a bin operatively connected to a pressure source and an inlet. The bin may house a sorting structure that consists of a plurality of separated members each having at least one sorting aperture arranged to separate and sort materials by size.

In some embodiments, a toy piece collection system consists of a bin operatively connected to a pressure source and an inlet. The bin houses a sorting structure that has first, second and third members each having at least one sorting aperture arranged to separate and sort materials by size. The respective members are separated from one another and collectively angled at a non-normal angle with respect to a bottom surface of the bin.

A pressure source is connected to a bin via an outlet in another embodiment of a toy piece collection system. A continuous pressure stream is created from the pressure source through the bin to an inlet of the bin prior to receiving at least one piece of material into the bin via the inlet in response to the pressure source. The received piece of material is sorted by size with a sorting structure housed within the bin where the sorting structure consists of a plurality of separated members each having at least one sorting aperture.

BRIEF DESCRIPTION OF THE DRAWINGS

FIG. 3 shows an example collection assembly capable of being employed in a toy piece collection system in accordance with assorted embodiments.

FIG. 4 illustrates an example collection assembly capable of being utilized in a toy piece collection system in accordance with various embodiments.

FIG. 5 conveys an example inlet assembly capable of being employed in the toy piece collection system of FIG. 1 in accordance with some embodiments.

FIG. 6 displays an example sensing portion of a toy piece collection system arranged in accordance with assorted embodiments.

DETAILED DESCRIPTION

Various embodiments of the present disclosure are directed to a system and method of use that efficiently collect and store any number of toy pieces.

With the proliferation of molded and extruded plastic manufacturing capabilities, many toys, such as LEGO® brand products, are reaching the marketplace with many relatively small pieces. Small toy pieces can also be prevalent in crafts and other toys, such as beads and doll accessories. Such increase in the number of toy pieces with relatively small physical sizes can be time-consuming, and often difficult, to collect, particularly in carpeted environments where pieces can become ensnared. Hence, there is a consumer and industry interest in improving the ease and efficiency of collecting a plurality of toy pieces.

Figure 1:
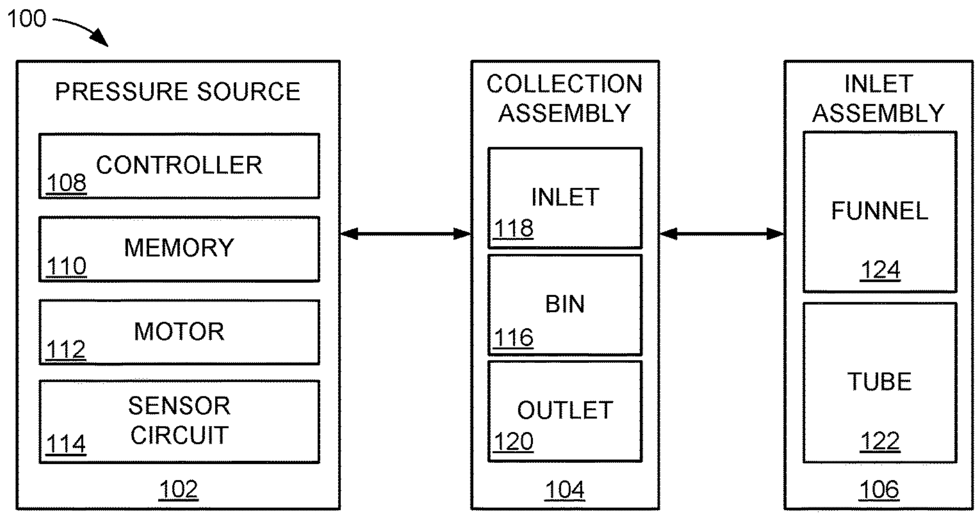
FIG. 1 is a block representation of an example toy piece collection system arranged in accordance with various embodiments.

FIG. 1 is a block representation of an example toy piece collection system 100 that can optimize toy piece aggregation in accordance with various embodiments. The system 100 has a pressure source 102 that communicates with a collection assembly 104 as well as an inlet assembly 106.

Although not required or limiting, the pressure source 102 may consist of at least a controller 108, such as microprocessor, that utilizes a local memory 110, such as a non-volatile solid state memory, to selectively operate a motor 112 to generate differential pressure, such as vacuum pressure compared to ambient air pressure. It is noted that the motor 112 is not limited to a particular configuration and can be electrically powered via AC or DC or may be an internal combustion type power source, such as a two-stroke or four-stroke gasoline or diesel engine.

The motor 112 can be activated by the controller 108 in execution of software stored in memory 110, or in response to sensed conditions from a sensor circuit 114 to generate a pressure stream that continuously extends through the collection assembly 104 to the inlet assembly 106 with enough force to induce movement of one or more toy pieces into a bin 116 of the collection assembly 104. The bin 116 may be constructed with at least one inlet 118 and outlet 120 that allow a pressure stream to pass to the inlet assembly 106 without destroying the effective power of the pressure stream.

The inlet assembly 106 can be a combination of a pressure tube 122 that can be utilized alone or with an attachment to channel a pressure stream to one or more toy pieces. While a pressure stream can be strong enough to displace a toy piece with mere proximal orientation of the tube 122, some embodiments attach a shaped funnel 124 to the tube to optimize delivery of a pressure stream to a toy piece. It is contemplated that the funnel 124 can increase the strength of the pressure stream, such as by having a venturi configured to increase the air speed of air in the pressure stream.

Figure 2:
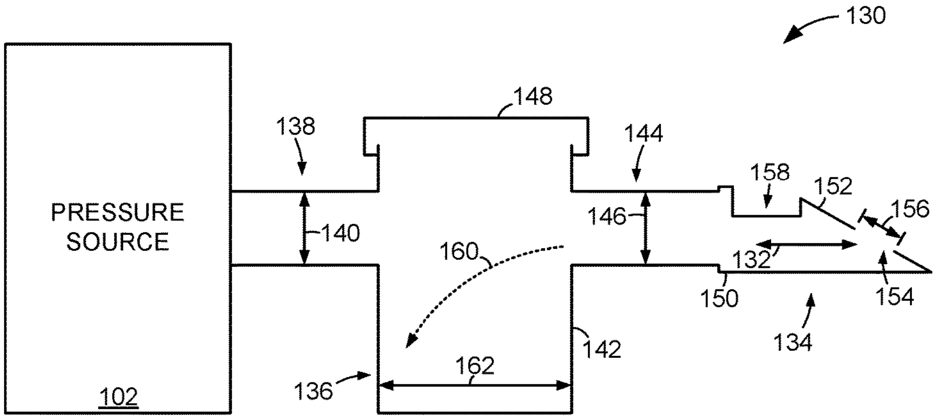
FIG. 2 displays a line representation of portions of an example toy piece collection system configured in accordance with some embodiments.

FIG. 2 illustrates an example toy piece collection system 130 arranged in accordance with some embodiments to aggregate any number of toy pieces. The system 130 can employ one or more pressure sources 102 that may be similar, or dissimilar, to independently, or concurrently, generate a pressure stream 132 strong enough to move a toy piece into an inlet assembly 134 and ultimately into a collection assembly 136. Each pressure source 102 is connected to the collection assembly 136 via a stream pathway 138 that may be any rigid, or flexible, material having a uniform, or varying width 140 extending into an outlet portion of a collection bin body 142.

The collection bin body 142 may also communicate with the inlet assembly 134 via a rigid, or flexible, pathway 144 that has a width 146 that is uniform, or varying, to match, or be different, than the pathway 138 between the pressure source 102 and the collection assembly 136. The collection bin 136 is attached to a lid 148 that partially, or completely, seals the bin 136 to preserve the strength of a pressure stream 132 passing from the pressure source 102 to the inlet assembly 134. It is contemplated that the inlet and/or outlet locations for the respective pathways 138 and 144 can pass through the lid 148 instead of, or in addition to, inlet and/or outlet locations in the bin body 142.

In some embodiments, the inlet assembly 134 comprises only the pathway 144, such as a flexible tube. In other embodiments, a collection attachment 150 is shaped to aid in delivery and utilization of the pressure stream 132 one or more toy pieces. The non-limiting configuration of a collection attachment 150 shown in FIG. 2 has an angled portion 152 that translates toy pieces to an inlet port 154 where the pressure stream 132 can efficiently pull the toy pieces towards the collection assembly 136.

The inlet port 154 has a size 156 that can restrict collection of toy pieces larger than that size 156 and allow those larger toy pieces to pass to an external collection region 158 that is beyond the influence of the pressure stream 132. For instance, the size 156 may be configured to allow toy pieces that have less than one square foot of surface area, that are smaller than 12 inches in any dimension, or are smaller than the pathway width 146 into the inlet assembly 134. As such, relatively large sized toy pieces that may inhibit the pathway 144 or the strength of the pressure stream 132 can be efficiently collected in the collection region 158 by moving the collection attachment 150 in relation to a toy piece.

With the pressure stream 132 uninhibited by large toy pieces, the toy pieces that are smaller than the port size 156 are allowed to pass through the pathway 144 and into the collection bin body 142 where the weight of the respective pieces induce a drop 160 from the bin inlet, as illustrated by the segmented line. That is, despite the bin being pressurized and sealed, gravity and the relatively low pressure of the pressure stream 132 results in the physical drop 160. The length 162 of the collection bin body 142 can be tuned, in some embodiments, to ensure the drop 160 is sufficient to prevent toy pieces from reaching the pressure source 102 or pathway 138.

FIG. 3 illustrates a line representation of an example collection assembly 170 capable of being used in the collection systems 100 and 130 of FIGS. 1 and 2. The collection assembly 170 has a hollow bin body 142 attached to a lid 148, such as with clamps, threads, or retention ridges. The bin body 142 has a plurality of different plates 172 positioned below the inlet 144 and outlet 138 pathways in order to sort toy pieces into different sizes. It is noted that the respective plates 172 can be rigid, or flexible, materials having one or more apertures 174, such a grate or mesh.

By configuring the plate 172 closest to the inlet pathway 144 with a relatively large sized aperture having a first width 176, toy pieces having a size greater than the first width 176 are retained by the plate 172 while smaller sized toy pieces fall to lower plates. As shown, lower plates 172 have progressively smaller widths 178, 180, and 182 that further separate toy pieces by size. It is noted that any number of different plates 172 and aperture widths can be utilized to separate toy pieces by size.

It is contemplated that a user, or system controller, can activate a vibratory means attached to the bin body 142 to aid in movement and separation of toy pieces. With the toy pieces sorted by size, the respective plates 172 can be individually removed from the bin body 142, which consequently removes the toy pieces that are larger than the plate's aperture. In some embodiments, one or more plates 172 can rotate and/or tilt to facilitate the efficient sorting of toy pieces once they arrive in the bin body 142.

FIG. 4 displays a line representation of another example collection assembly 190 constructed and operated to collect toy pieces in accordance with some embodiments. While not required or limiting, the inlet pathway 192 is offset from the outlet pathway 138. That is, the center of the respective pathways 138 and 192 are not aligned, which can promote toy pieces coming into the bin body 142 impacting a disassembling feature 194 that is shaped to separate attached toy pieces without damaging the individual pieces. For example, the disassembling feature 194 may be constructed of a material that is physically softer than the toy pieces, such as a material that has a lower Rockwell hardness value, with a spike, slope, edge, and/or protrusion that increases the chance of toy pieces separating upon impact compared to impact with a planar wall of the bin body 142.

While toy pieces that ricochet of the disassembling feature 194 can be simply collected at the bottom of the bin body 142, some embodiments arrange sorting plates 196 at non-normal angles with progressively different widths 198 to sort toy pieces by size. It can be appreciated that the angled orientation of the respective plates 196 passively utilizes gravity to sort toy pieces by size. The lateral offset orientation of the respective plate apertures 200 may further aid in the sorting of differently sized toy pieces.

Although toy piece sorting may be conducted in the bin body 142, the inlet assembly 106 may be configured to sort toy pieces by size and/or shape. FIG. 5 is an end view line representation of an example inlet assembly 210 that consists of a tube 122 connected to a selection insert 212 that reduces the exposed tube area, which can be characterized as the cross-sectional of the tube 122. The selection insert 212 may have any number of apertures 214 that have a size and shape corresponding to the type of toy piece to be collected.

As non-limiting examples, an aperture 214 may have a rectangular 216, circular 218, and/or patterned 220 shape and size that are individually conducive to allowing less than all of a plurality of toy pieces into the tube 122. It is contemplated that the selection insert 212 can be utilized with a funnel 214 or collection assembly 150 in order to pick up selected sized toy pieces. The ability to sort toy pieces by size and shape can provide several practical advantages. However, the sorting capabilities of the selection insert 212 and any sorting plates 172/196 can be degraded by unwanted contaminating debris being picked up by the pressure stream, such as dust, dirt, and hair particulates as well as other debris like coin money. Thus, assorted embodiments are directed to collecting toy pieces without picking up unwanted contaminates.

FIG. 6 illustrates a portion of an example toy piece collection system 230 that is constructed and operated in accordance with assorted embodiments to collect toy pieces 232 without moving underlying contaminates 234, such as particulates and/or debris trapped in a carpeted surface 236. As shown, an inlet tube 122 is attached to a collection plow 238 that slides along the top of a carpeted surface to engage toy pieces 222 without dislodging the underlying contaminates 234. While the shape, size, and configuration of the plow 238 is not limited, a sloped ramp 240 can be attached to one or more wheels 242 to allow efficient movement across uneven and/or non-uniform types of surface cover, such as hardwood floors, carpets, rugs, or tile.

The wheeled arrangement of the plow 238 may be configured to be partially, or completely, motorized to allow autonomy as directed by a computer controller 108. The wheeled plow arrangement may also be modified to be smooth skids or slides that promote efficient movement over a variety of different surfaces. Regardless of the configuration of the plow 238, the ability to engage and collect a toy piece 232 without collecting an underlying contaminate allows the collection system 230 to operate efficiently over time without concern for clogging. In some embodiments, contaminates that are inadvertently collected by the plow 238 can be separated downstream so that non-toy pieces are diverted to a first bin while toy pieces go to a different bin.

The toy piece collection system 230 can be constructed with one or more sensors 244, such as optical, proximity, acoustic, and vibration sensors, that independently or concurrently indicate to a local controller 108 the size and quantity of toy pieces in front of the tube 122. It is contemplated that sensors 244 can be positioned internally and/or externally, as shown by segmented box 246, with respect to the tube 122 to provide accurate assessment of the toy pieces entering the system 230. The respective sensors 244 can be continuously, sporadically, or routinely monitored by the sensor circuit 114 to evaluate the operating conditions of the system 230.

The ability to assess the incoming volume of toy pieces with the sensors 244 allows the sensor circuit 114 to conduct compensation strategies to optimize the collection of toy pieces. For example, the sensor circuit 114 may recognize a large volume of incoming toy pieces and increase the strength of the pressure stream or may recognize a low volume of toy pieces and reduce the power consumption of the motor 112. Various embodiments configure the sensor circuit 114 to access a prediction algorithm 248 to proactively alter system 230 operating conditions, such as motor 112 speed, to ensure the system 230 remains unclogged and with optimized performance. The prediction algorithm 248 may utilize a log of past system activity, such as overall volume of toy pieces, that is stored in local memory 110 to predict an alteration of operating parameters that increases the chance all encountered toy pieces are collected in a single pass of the tube 122.

The continuous or sporadic logging of operating conditions, such as humidity, temperature, average toy piece size, and toy piece volume, can allow the local controller 108 to make intelligent decisions, such as altering a user via audible or visual cues, in order to maintain the efficient collection of toy pieces. By proactively changing operating parameters, like bursting motor speed, the controller 108 can decrease the overall amount of time the system 230 is active, which prolongs the life of the system 230.

Figure 7:
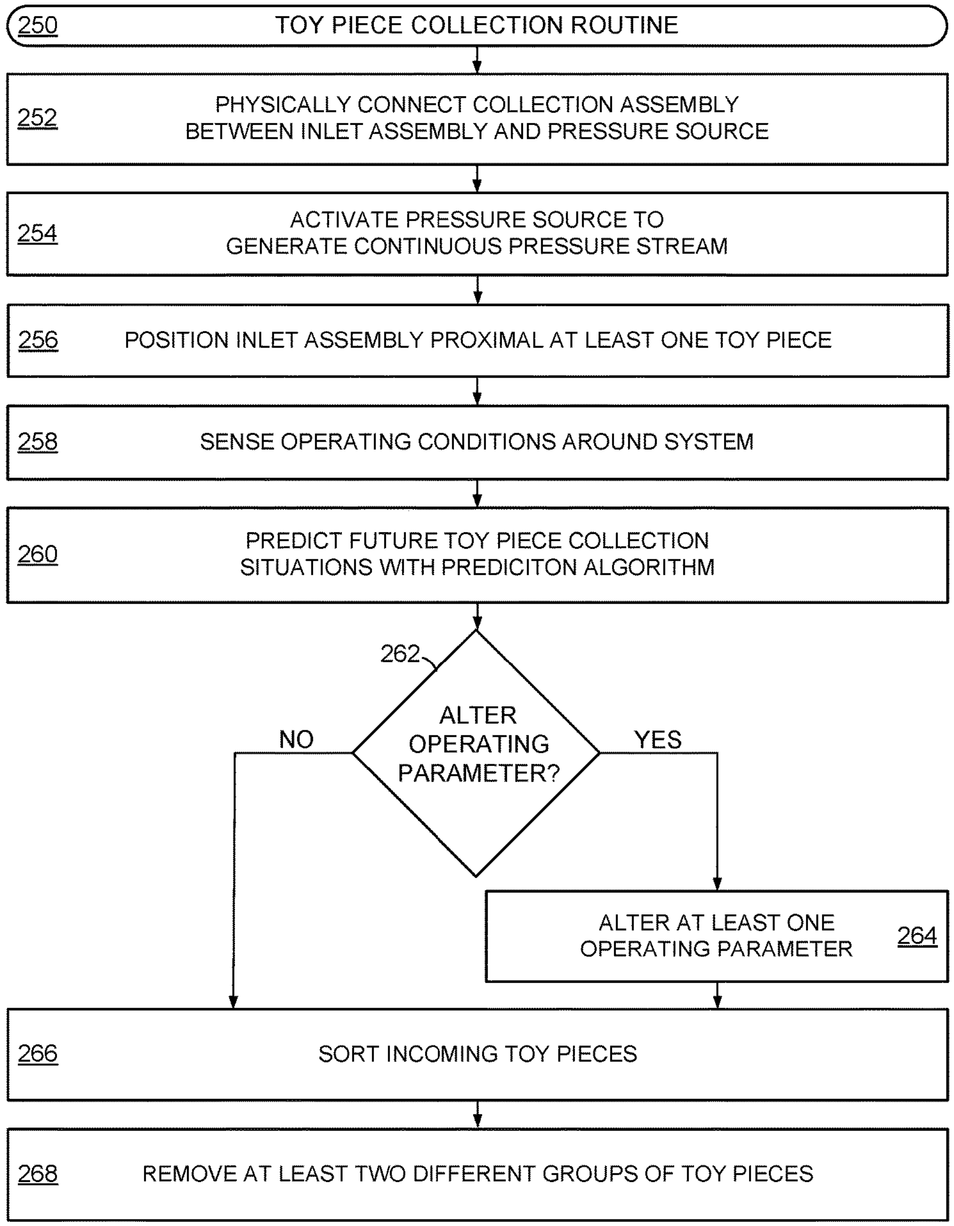
FIG. 7 provides a flowchart of an example toy piece collection routine that may be carried out in accordance with various embodiments.

FIG. 7 is a flowchart of an example toy piece collection routine 250 that is carried out in accordance with some embodiments. The routine 250 can begin with the physical connection of a collection assembly between a pressure source and an inlet assembly in step 252. Such physical connection can be facilitated by one or more pathways located in one or more locations. For example, step 252 may assemble a hand-held device that contains each assembly and the pressure source. As another non-limiting example, step 252 can position the collection assembly in a different room of a home than the inlet assembly.

The interconnection of the various aspects allows step 254 to activate the pressure source to generate a continuous pressure stream, which may maintain an average negative vacuum pressure compared to the ambient pressure around a toy piece collection system. Next, step 256 positions the inlet assembly proximal at least one toy piece. Step 256 may be conducted individually or concurrently with step 258 sensing the operating conditions around the toy piece collection system, such as the average size and volume of toy pieces or the estimated time of toy pieces reaching the collection assembly.

Any number of previously logged operating conditions, or a pre-loaded operating model, can be consulted by a local controller to predict future toy piece collection situations in step 260. A collection situation may be an increase, or decrease, in toy piece frequency, for instance. The predicted situation from step 260 is then evaluated in decision 262 to determine if one or more operating parameters of the system need to be altered. If so, step 264 proceeds to alter at least one operating parameter, such as motor speed or inlet assembly position, as directed by the local controller in view of the predicted collection situation.

At the end of step 264, or in the event no operating parameter is to be changed from decision 262, step 266 sorts incoming toy pieces. The sorting may be by size, shape, weight, or color and can result in at least two separate groups of toy pieces located in the bin body of the collection assembly that are subsequently removed in step 268. As a result, a user can organize a plurality of differently configured toy pieces by one or more sorting criteria. It is contemplated that the sorting of step 266 is conducted in separate bin bodies of the collection assembly.

Through the various embodiments of the present disclosure, toy pieces can be efficiently collected and sorted. The ability to tune the manner in which pieces are picked up, such as with the plow 238 of FIG. 6, and the manner in which pieces are sorted allows the toy piece collection system to be optimized to easily translate a plurality of toy pieces from any surface into a common collection bin.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a bin operatively connected to a pressure source and an inlet, the bin housing a sorting structure comprising a disassembling feature and a plurality of separated members, each of the plurality of separated members having at least one sorting aperture arranged to separate and sort materials by size, the disassembling feature positioned between the plurality of separated members and an outlet of the bin.

2. The apparatus of claim 1, wherein the pressure source comprises an electric motor providing a continuous stream of vacuum pressure to the bin.

3. The apparatus of claim 2, wherein the continuous stream is uninhibited from the pressure source to the inlet of the bin.

4. The apparatus of claim 1, wherein each member of the plurality of separated members is oriented parallel to one another at a common angle.

5. The apparatus of claim 1, wherein each member of the plurality of separated members are separated from the inlet and from an outlet connecting the bin to the pressure source.

6. The apparatus of claim 1, wherein the apertures of the respective plurality of separated members are vertically offset from one another.

7. The apparatus of claim 6, wherein each aperture of the respective plurality of separated members has an edge aligned along a vertical axis, the vertical axis oriented perpendicular to each member of the plurality of separated members.

8. The apparatus of claim 1, wherein the disassembling feature is horizontally aligned with the inlet.

9. The apparatus of claim 8, wherein the inlet is positioned closed to a bottom of the bin than the outlet.

10. The apparatus of claim 1, wherein at least one of the plurality of separated members comprises a flexible material.

11. A system comprising a bin operatively connected to a pressure source and an inlet, the bin housing a sorting structure comprising a disassembling feature, first member, second member, and third member, each of the respective members having at least one sorting aperture arranged to separate and sort materials by size, the respective members separated from one another and collectively angled at a non-normal angle with respect to a bottom surface of the bin, the disassembling feature positioned between the plurality of separated members and an outlet of the bin.

12. The system of claim 11, wherein the second member is disposed between the first and third members, the third member being closer to the bottom surface than the first or second members, the first member having a first sorting aperture with a first size, the second member having a second sorting aperture, the first size being larger than the second size.

13. The system of claim 11, wherein the inlet is physically attached to a collection assembly comprising a sloped ramp configured to engage a piece of material without collecting underlying contaminates.

14. The system of claim 13, wherein the collection assembly comprises at least one sensor and one or more wheels.

15. The system of claim 11, wherein an insert is positioned within the inlet to reduce a cross-sectional area of the inlet, the insert having a selection aperture with a size and shape corresponding to a toy piece.

* * * * *